United States Patent [19]

Morelli

[11] Patent Number: 4,764,191
[45] Date of Patent: Aug. 16, 1988

[54] AIR FILTER

[76] Inventor: Aldo Morelli, 25 Rockwood Terr., Jamaica Plain, Mass. 02134

[21] Appl. No.: 104,275

[22] Filed: Oct. 5, 1987

[51] Int. Cl.⁴ ............................................. B01D 46/04
[52] U.S. Cl. ...................................... 55/302; 55/482; 55/498; 55/431; 55/432
[58] Field of Search .................... 55/385 B, 302, 482, 55/486, 487, 432, 498, 510

[56] References Cited

U.S. PATENT DOCUMENTS 3,332,217 7/1967 Rymer .................................. 55/302
3,488,928 1/1970 Tarala ................................... 55/510
3,934,992 1/1976 Thompson ........................ 55/385 B
4,488,889 12/1984 McCarroll ........................... 55/510

FOREIGN PATENT DOCUMENTS 344227 3/1931 United Kingdom .................. 55/302

Primary Examiner—Bernard Nozick
Attorney, Agent, or Firm—Robert T. Gammons

[57] ABSTRACT

An air filter for combustion engines used in motorized heavy equipment so structured as to be restored to full usage without replacement of the filter elements.

11 Claims, 3 Drawing Sheets

AIR FILTER

BACKGROUND OF THE INVENTION

In the excavation business, demolition business and other activities wherein a considerable amount of dust is generated, trucks, tractors and other motorized equipment are subjected to considerable infiltration of abrasive dust, with the result that such motorized equipment has a relatively short life span. Air cleaners for removing the dust entering the intake of gasoline engines are manufactured by Farr Company of Los Angeles, Calif. as shown, for example, in their advertising literature "UNIPAMIV4C" Bulletin No. B-1500-50C; "ROTOPAMIC/AUTOPAMIC" Bulletin No. B-1500-62; and "ECO-CM" Bulletin J-1500-4. In all instances, there is a replaceable filter element which constitutes the major component of the air cleaner. As constructed, the replaceable filter component constitutes a major cost as a replaceable item and requires an expenditure of considerable time for replacement with the consequence that under normal conditions, the user, rather than disassembling the air cleaner and replacing the filter element, discards the entire structure. It is the purpose of this invention to provide an air cleaner wherein the filter module need not be replaced and especially a filter module which can be repeatedly used without having to remove the air cleaner from the vehicle and, hence, without extensive delay in the use of the vehicle under normal operating conditions.

SUMMARY OF THE INVENTION

As herein illustrated, the invention resides in an air cleaner for a combustion engine comprising a manifold having an inlet opening and an outlet opening, a filter element disposed in the manifold between the inlet opening and the outlet opening in a position to intercept the particulate material in the air stream moving from the inlet opening to the outlet opening, a discharge opening in communication with the surface of the filter element which intercepts the solid particles and means for clearing the filter element of solids for discharge through the discharge opening. The manifold embodies a side wall and spaced, parallel end walls at opposite ends of the side wall, the inlet opening is in one end wall, the outlet opening is in the side wall and the filter element is disposed in the manifold in concentric relation to the inlet opening and extending from one end wall to the other end wall such as to define an intake chamber within the manifold interiorly of the filter element and an outlet chamber exteriorly of the filter element. The discharge opening in the other end wall is concentric with the inlet opening in the one wall and is in communication with the interior of the filter element. The filter element is of circular cross section and of conical configuration and is disposed with its smaller end in concentric relation to the inlet and with its larger end in concentric relation to the discharge opening. As illustrated, the filter element comprises a rigid cage within which is disposed a porous fabric. Desirably, the cage is comprised of reticulated metal and the porous fabric is coextensive with the inner side thereof and is comprised of a fabric felted on one surface with the felted surface disposed at the inner side. A second filter element is disposed in the manifold between the upper and lower ends in concentric relation with the first filter element, radially spaced from both the first filter element and the side of the manifold. The second filter element comprises a rigid cylindrical cage within which is disposed a felted, porous fabric. There is an inlet conductor mounted to the end wall containing the inlet opening. A gland is disposed about the inlet conduit and sealed within the inlet opening. A support is disposed about the inlet conductor with one end bolted to the end wall and the other end disposed about the other end of the conductor. The support defines, in conjunction with the inlet conductor, an antechamber concentric with the manifold chamber and there is means connecting the antechamber to the inlet of the manifold chamber between the filter elements. There are one or more conductors disposed in the end wall about the conductor providing communication between the antechamber and the manifold chamber. A conductor connects the interior of the antechamber to a source of pressure. There is a cap mounted to the upper end of the inlet conductor defining an inlet opening in concentric relation to the inlet conductor. There is a discharge chamber mounted to the discharge opening in concentric relation to the discharge opening having an opening at its lower end and a normally-closed valve element at the lower end thereof. There is an opening at the lower end of the discharge chamber and a conductor connecting it to a source of pressure. The filter elements are removably mounted between the end walls.

The invention will now be described in greater detail with reference to the accompanying drawings, wherein.

Figure 1:
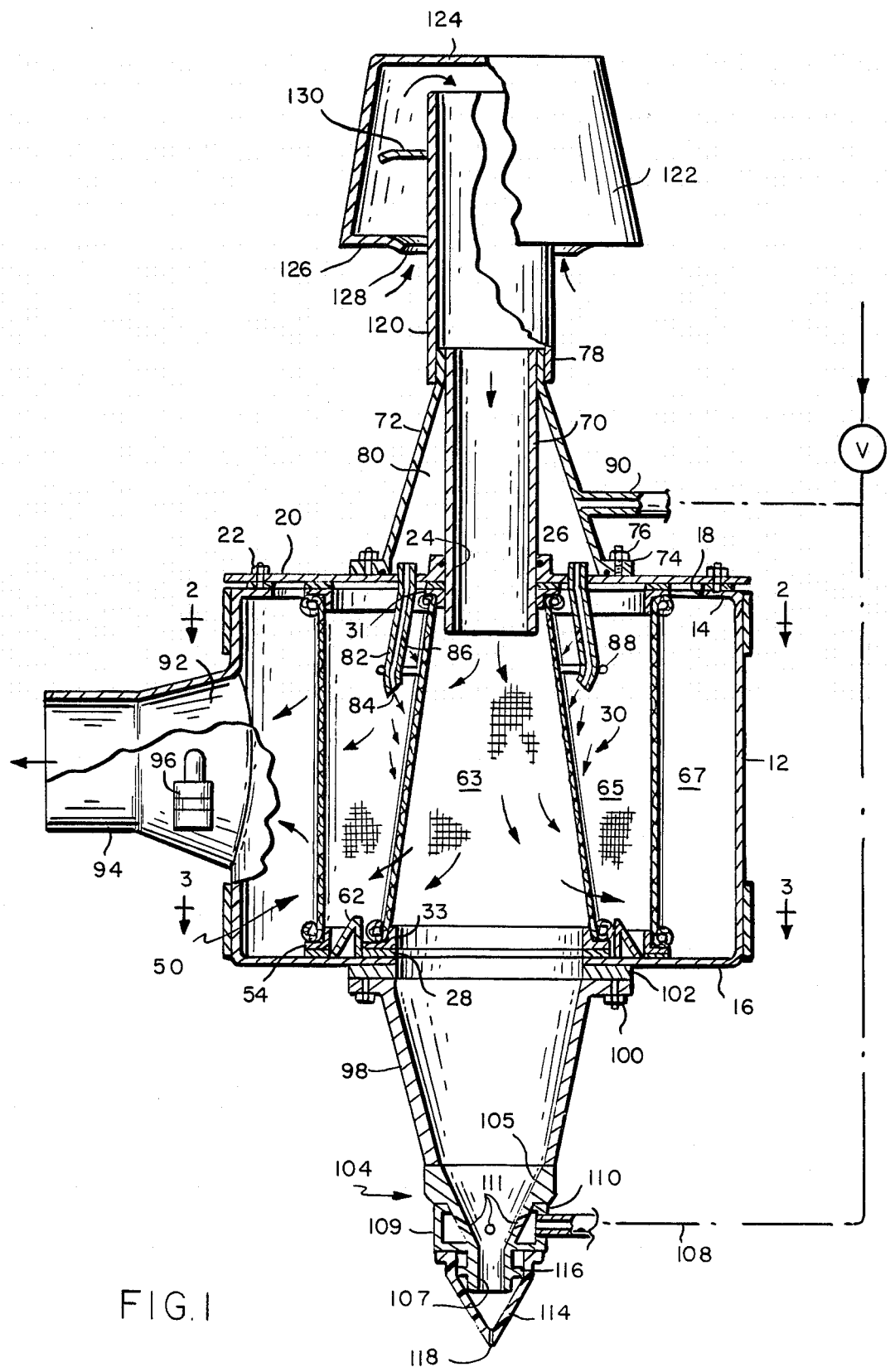
FIG. 1 is an elevation partly in section and partly in elevation.
Figure 2:
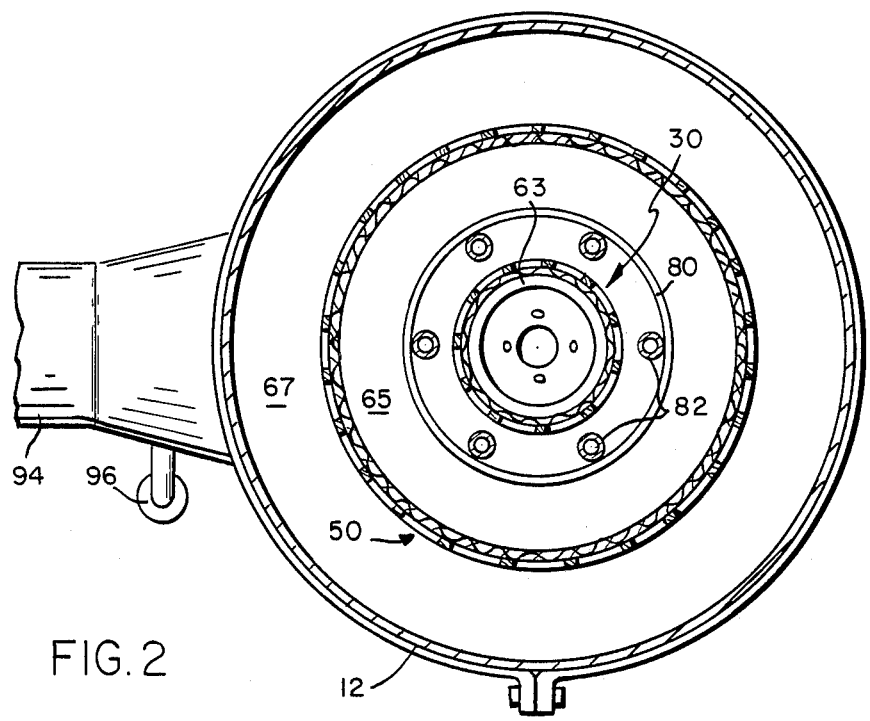
FIG. 2 is a diametral section taken on the line 2—2 of FIG. 1.
Figure 3:
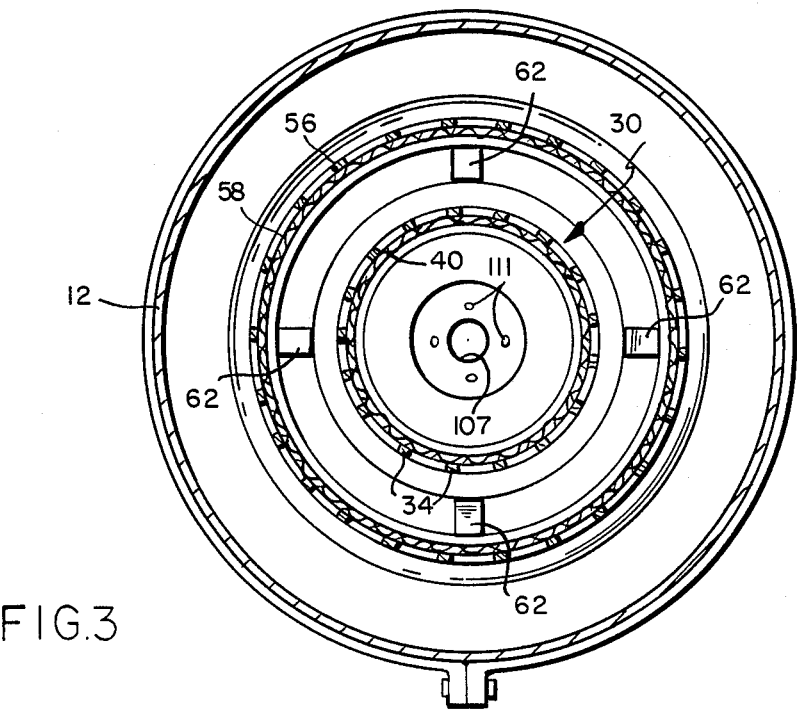
FIG. 3 is a diametral section taken on the line 3—3 of FIG. 1.
Figure 4:
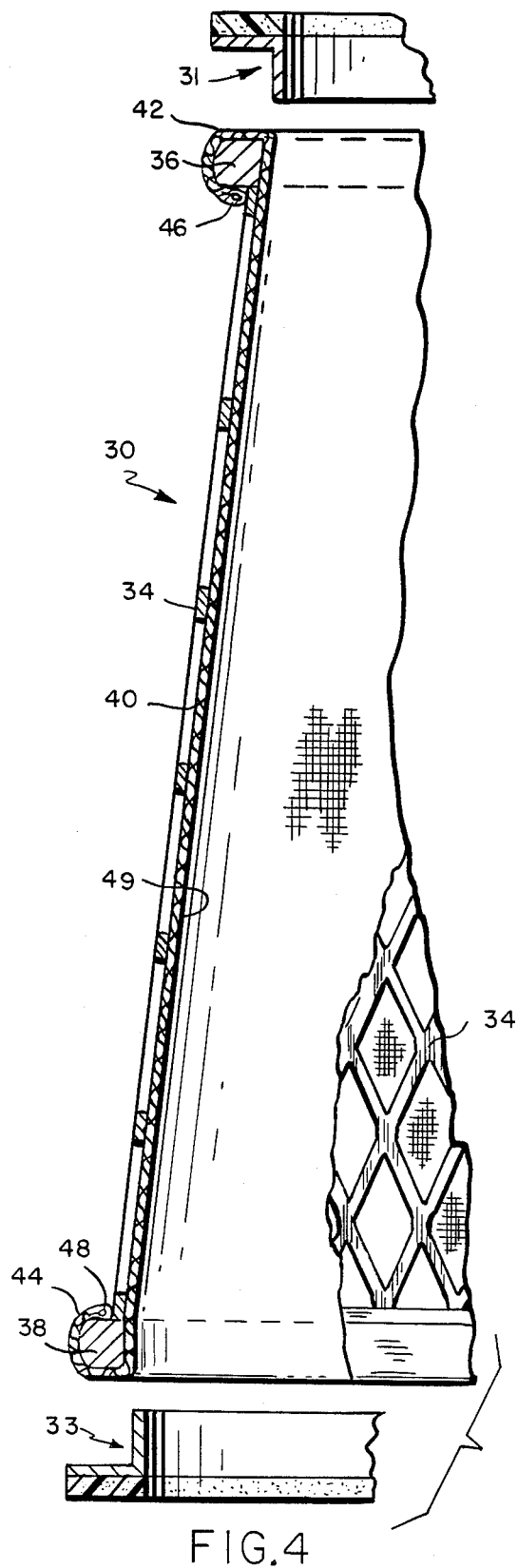
FIG. 4 is a fragmentary section of the inner conical filter element to larger scale.

Referring to the drawings, FIG. 1, the air filter comprises a manifold 10 of circular cross section embodying a cylindrical side wall 12 and spaced, circular end walls 14 and 16 at opposite ends of the side wall 12. The end wall 14 has a circular opening 18 concentric with the side wall. A circular end plate 20 is attached by means of bolts 22 to the end wall 14. The end plate 20 contains a central opening 24 bounded by a flange 26 and the end wall 16 contains an opening 28 concentric with the opening 24. A conical filter element 30 is disposed between the end walls 16 and end plate 20 in concentric relation to the openings therein between centering rings 31 and 33 which extend into the open ends of the filter element 30. As more specifically shown in FIG. 4, the filter element 30 comprises a foraminous metal cone 34, at the opposite ends of which there are circular collars 36 and 38 and a fabric sleeve 40 disposed within the cone with its upper and lower edges 42 and 44 folded outwardly about the end collars and secured by drawstrings 46 and 48. The sleeve 40 is of a woven material and its inner surface is felted at 49.

Figure 5:
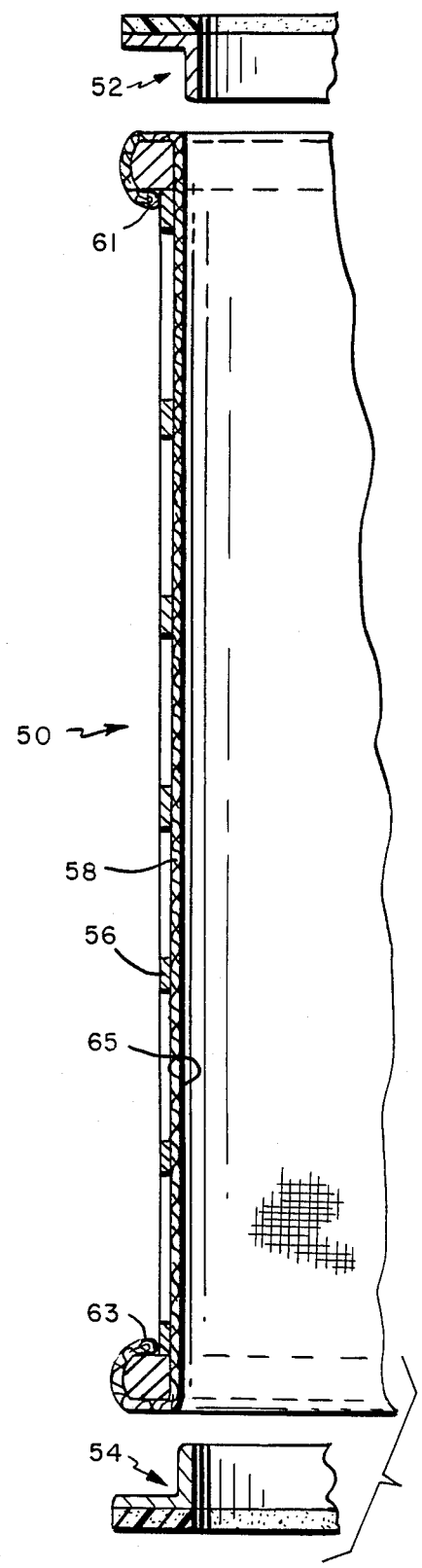
FIG. 5 is a fragmentary section of the outer cylindrical filter element to larger scale.

A second filter element 50, FIG. 5, of circular cross section and cylindrical configuration is disposed between the upper and lower ends 14 and 16 about the conical filter element 30 between annular rings 52 and 54. Like the conical member 30, the cylindrical member 50 comprises a foraminous metal sleeve 56 within which there is disposed a fabric sleeve 58 with its opposite ends folded outwardly about the opposite ends of the foraminous sleeve and secured by drawstrings 61,63. The fabric sleeve has a felted surface 65 on its inner side, as does the sleeve 40. In order to hold the lower ends of the filter elements in concentric relation to each other, spacers 62, FIG. 1, are mounted to the end wall 16 between the lower ends of the filter elements 30 and 50. As thus constructed, the manifold contains a center chamber 63 and concentric surrounding chambers 65 and 67.

An intake conductor 70 is mounted to the top of the manifold within the opening 24 with its lower end extending through the end plate 20 into the chamber 63 and its upper end extending upwardly from the end plate 20. A support in the form of a cone 72 is disposed about the conductor 70 with its lower end 74 secured by bolts 76 to the end plate 20 and its upper end 78 engaged with the upper end of the conductor 70. The support 72 defines, in conjunction with the end plate 20 and the cone 72, a chamber 80. The chamber 80 is connected to the chamber 65 by a plurality of circularly disposed conductors 82, the upper ends of which are situated in the chamber 80 and the lower ends of which are situated in the chamber 65. The lower ends of the conductors 82 define openings 84 and intermediate the upper and lower ends there are openings 86. A ring 88 connects the lower ends to each other, supporting them in rigidly-spaced relation to each other. Desirably, the lower ends are disposed at an angle to the surface of the inner filter element 30. A conductor 90 is connected to the cone 72 at one end and at its other end by way of a valve V to a source of pressure.

An outlet opening 92 is provided in the side wall 12 within which there is mounted a discharge conductor 94 through which are passed through the filter elements in the normal operation of the engine is conducted to the engine. An indicator 96 is mounted to the conductor 94 for recording the pressure.

A discharge chamber 98 of generally conical configuration is mounted by means of bolts 100 to the wall 16 in concentric relation to the opening 28 therein with a gasket 102 therebetween. The lower end of the discharge chamber 98 is provided with a closure 104 embodying a conical portion 105 and a cylindrical portion 107. A manifold 109 is disposed about the conical portion and openings 111 connect the interior of the conical portion with the manifold. A conductor 108 connects the valve V with an opening 110 in the manifold. Desirably, openings 111 are disposed at an angle to the axis thereof of the cylindrical portion 107. A flexible cap 114 is elastically applied to the lower end of the cylindrical portion 107 over a radial rib 116 which holds it in place. The cap contains a perforation 118 which is normally closed, but will permit expulsion of filtrate when pressure is applied through the conductors 90 and 108.

At the upper end of the cone 72, there is mounted a cylindrical extension 120 and at the upper end of the extension 120, there is mounted a frustoconical cap 122 comprising an upper imperforate end 124 and a lower end 126 containing an opening 128 concentric with the extension 120. Desirably, a deflector plate 130 is mounted to the extension 120 within the cap 122.

The structure as thus described is installed by means of a suitable bracket on an internal combustion engine with the discharge conductor 94 coupled to the intake of the engine. In normal operating conditions, when the engine is running, air is drawn inwardly through the cap 124, conductor 70 and manifold 12 into the engine. As the air passes through the manifold and through the filter elements 30 and 50, any particulate material entrained int he air stream is separated therefrom as the air passes through the filter elements. The major portion of the particulate material is deposited on the inner side of the conical filter element 30 and any residual particulate material that passes through the filter element 30 is deposited on the inside of the cylindrical filter element 50.

The gage 96 indicates a decrease in the flow of air entering the engine due to obstruction of the filter elements 30 and 50 by an accumulation of particulate material, so that the driver of the vehicle equipped with the filter as thus described will stop the motor and open the valve V so that air under pressure is delivered by way of the conductor 90 into the chamber 80 and from thence through the jet pipes 82 into the annular space 65 between the filter element 30 and the filter element 50. The air entering the chamber 65 will blow the particulate material on the inside of the filter element 30 inwardly so that it will gravitate into the discharge chamber 98. Air is also supplied by way of the conductor 108 to the manifold 109 at the lower end of the discharge chamber in a direction to propel the gravitating particulate material through the nozzle 114.

The major proportion of the deposited particulate material is thus cleared of the filter element 30. However, over the course of a long period, some particulate material escapes through the filter element 30 into the space 65 and deposits on the filter element 50. When this happens, the manifold is dismantled and both filter elements removed, cleaned and reinstalled. The time when such major dismantling should take place would be indicated by the pressure drop on the gauge 96.

Dismantling for cleaning is easily effected by removing the bolts 22, lifting the end plate 20 from the end wall 14 and removing the filter elements 30 and 50 from within the manifold.

The structure as thus described is highly effective in removing particulate material from the air drawn into the engine under even the most severe conditions, affords a visual indication of a drop in pressure indicative of an accumulation of particulate material and provides for easy disassembly and reassembly to clear it of particulate material and restore it to its normal efficiency with minimal difficulty.

It should be understood that the present disclosure is for the purpose of illustration only and includes all modifications or improvements which fall within the scope of the appended claims.

What is claimed is:

1. An air filter for a combustion engine comprising a cylindrical housing having circular end walls, concentric openings comprising an inlet opening and discharge opening in said end walls, an inlet conductor disposed in the opening in one end wall through which media to be filtered can enter the housing, a conductor disposed about said discharge opening in the other end wall through which filtrate can be discharged from the housing, filter elements disposed in the housing in concentric relation to the openings in the end walls and to each other comprising a first filter element of conical configuration disposed with its smaller end concentric with the inlet opening and its larger end concentric with the outlet opening, said first filter element defining an inner chamber, a second filter element of cylindrical configuration disposed about the first filter element such as to define therewith a first annular chamber disposed about the inner chamber, said second filter element being of smaller diameter than the housing such as to define a second annular chamber disposed about the first annular chamber and an outlet opening in the wall of the housing in communication with said second annular chamber and wherein each of said filter elements comprises a metal cage within which is disposed a porous fabric sleeve.

2. An air filter according to claim 1 wherein the inlet conductor is mounted to one end wall of the housing with one end extending through said inlet opening into said conical filter element, a conical housing disposed about the inlet conductor with one end abutting the end wall of the cylindrical housing and the other end abutting the inlet conductor such as to define a conical chamber disposed about the inlet conductor, said conical housing containing an opening through which air can be introduced into said conical chamber and said end wall containing openings through which air introduced into the conical chamber can be discharged into the annular space between the conical filter element and the surrounding cylindrical filter element.

3. An air filter according to claim 1 wherein there is a cap mounted to the upper end of the inlet conductor defining an inlet opening in concentric relation to the inlet conductor.

4. An air filter according to claim 1 wherein there is a tubular extension detachably engaged with the upper end of the conical housing for mounting the capped upper end of the inlet conductor.

5. An air filter according to claim 1 wherein there is a discharge chamber mounted to the discharge opening in concentric relation thereto having an opening at its lower end and a normally-closed valve element at said lower end.

6. An air filter according to claim 1 wherein the filter elements are removably mounted between the end walls.

7. An air filter according to claim 1 wherein annular supports are mounted to the inner side of the end walls about the inlet and discharge openings and the filter elements are removably mounted between the supports.

8. An air filter according to claim 1 wherein said one end wall is desirably mounted to the side wall such as to enable removing the filter element from the manifold for cleaning.

9. An air filter according to claim 1 wherein there is a conical discharge chamber mounted to the discharge opening having an opening at its lower end and a normally-closed valve element at said lower end.

10. An air filter according to claim 9 wherein there is an inlet opening in the conical discharge chamber above the discharge opening at said lower open end and conductor means connecting it to a source of pressure.

11. An air filter according to claim 10 wherein said inlet opening is disposed at an angle to the axis of the discharge opening.

* * * * *